United States Patent [19]

Merkle et al.

[11] Patent Number: 5,157,726
[45] Date of Patent: Oct. 20, 1992

[54] DOCUMENT COPY AUTHENTICATION

[75] Inventors: Ralph C. Merkle, Sunnyvale; Dan S. Bloomberg, Palo Alto; John S. Brown, San Francisco, all of Calif.

[73] Assignee: Xerox Corporation, Stamford, Conn.

[21] Appl. No.: 810,644

[22] Filed: Dec. 19, 1991

[51] Int. Cl.$^5$ .............................................. H04K 1/00
[52] U.S. Cl. ........................................ 380/23; 380/55
[58] Field of Search .................. 380/23, 30, 3, 55; 355/201; 283/902, 901, 23, 74

[56] References Cited

U.S. PATENT DOCUMENTS

| | | |
|---|---|---|
| 4,309,569 | 1/1982 | Merkle . |
| 4,625,076 | 11/1986 | Okamoto et al. . |
| 4,650,975 | 3/1987 | Kitchener . |
| 4,656,474 | 4/1987 | Mollier et al. . |
| 4,807,287 | 2/1989 | Tucker et al. . |
| 4,881,264 | 11/1989 | Merkle . |
| 4,981,370 | 1/1991 | Dziewit et al. ............... 380/23 X |
| 4,995,082 | 2/1991 | Schnorr . |
| 5,001,752 | 3/1991 | Fischer . |
| 5,020,105 | 5/1991 | Rosen et al. . |
| 5,022,080 | 6/1991 | Durst et al. ............... 380/23 |

FOREIGN PATENT DOCUMENTS

| | | | |
|---|---|---|---|
| 0161181 | 11/1985 | European Pat. Off. ............... | 380/23 |
| 0229006 | 7/1987 | European Pat. Off. ............... | 380/23 |
| 8501129 | 3/1985 | World Int. Prop. O. ........... | 355/201 |

Primary Examiner—Tod R. Swann
Attorney, Agent, or Firm—Rosen, Dainow & Jacobs

[57] ABSTRACT

A system for authenticating a hard copy of an original document. The system employs a special copying machine at the sender's end together with a special ID card (smart card) or other user identification for activating the special machine, and a special copying machine at the receiving end. At the sender's station, the original document and ID card are inserted into the machine. The latter digitizes the document text, to produce a digital signature which incorporates unique information from the sender's ID card. This machine then produces a hard copy of the document to which is added the digital signature. The sender retains the original, but forwards the copy to the recipient or receiver. The receiver then inserts the received copy into the machine at his location, which digitizes and processes the document text and signature and indicates whether the digital signature is valid. Preferably a dual key authentication system is used, with the digital signature incorporating the sender's secret signing key, and the receiver using the related public key in the validation process.

18 Claims, 4 Drawing Sheets

DOCUMENT COPY AUTHENTICATION

The present invention relates to a system for making and authenticating a copy of an original document.

BACKGROUND OF INVENTION

It is known how to authenticate original documents using a digital signature. The latter provides a unique pattern based on the digitized document text and a unique signing key (or secret key) of the document creator. When the original with attached digital signature is transmitted (electronically or as a hard copy) to a third party, the latter through digitizing and processing of the received document and digital signature can determine whether the document is genuine.

Ways of providing digital signatures of original documents are described in U.S. Pat. Nos. 4,881,264; 4,309,569; 4,625,076; 4,656,474, and other related patents, whose contents are hereby incorporated by reference. The digital signature, in effect, is an encoded version of the entire document, reduced to a unique marking added as a seal to the original document. If the original document or its signature is modified in any way, the alterations will be detected when the document and signature are checked with the appropriate decoding key.

The first of the above-described patents describes a dual-key or public key cryptosystem for generating a digital signature of a document. In this system, the originator or creator uses a private or secret signing key for processing the document by a particular algorithm to generate a "signature" represented by a sequence of bits ranging from several hundred to several thousand depending upon the particular system used and the level of security desired. The receiver of the digital signature would possess or be given a checking or public key, mathematically related to the signing key, which can be used to process the document through a related algorithm to determine whether the received document was indeed generated with the authentic signing key of the creator. If the contents of the document are to be kept secret, then it can be separately encoded and decoded by one of many known encoding and encryption schemes.

One company has described a so-called time stamp seal (akin to a notary seal) representing a digital signature of the document plus a time stamp to mark the time when the document was received and the digital signature recorded. U.S. Pat. No. 5,001,752 describes in detail another version of a time notarization system.

Another company emphasizes the public key cryptography system as a way of achieving a tamper-proof digital signature that can be used to establish the authenticity of electronic mail messages.

U.S. Pat. No. 4,650,975 describes a scheme for authentication of an identifying IC card employing a personal identification number (PIN) for checking the validity of a card holder using a Data Encryption Standard (DES).

The emphasis in the art has been the authentication of original documents or electronic mail messages. There is a much greater need, however, for a reliable scheme to authenticate a hard copy of an original document. The various schemes described above applicable to original documents would not apply to a copy of the document, or at least would not leave a receiver of such a copy with a high level of confidence that the copy in his possession is, in fact, an exact duplicate of some original document located at a distant place.

SUMMARY OF THE INVENTION

A major object of the invention is a system for making or authenticating a hard copy of an original document. Authenticating a copy means verifying that the copy currently in the possession of the receiver is in fact identical to an original document from which the copy was prepared.

This is achieved, in accordance with one aspect of the invention, by making a copy of the original document on a copying machine that also generates from the original a digital signature that is affixed to the copy, constituting a digitally signed copy of the original document. The digital information can be in human-readable or encrypted form.

In accordance with another aspect of the present invention, in order to guarantee that the supplier of the original document authorized the making of the signed copy, identifying information unique to the supplier may be required before the copying machine makes the signed copy.

In a preferred embodiment, a special key known only to the signer or document originator is used to generate the signed copy. A second special key needed to check the signed copy can be included in the signed copy.

In accordance with a further aspect of the invention, a time stamp can also be included in the digital signature.

The thus-produced signed copy can then be forwarded by any means and by any person to a receiver at a location, usually distant, where the receiver need have no access to the original document.

The receiver then processes the signed copy through a similar copying machine that has the capability of storing the unique identifying information of the sender, or of deriving from the signed copy, if incorporated therein, the unique identifying information or related information, such as a checking key as previously described. The resultant processing provides an indication of whether the received copy is an authentic copy of the original. The indication could be as simple as a Boolean output on the machine indicating the processed document is valid or invalid. Alternatively, a message can be displayed on the machine or affixed to a digitally cleaned copy of the signed document that would indicate that the cleaned copy looks like an original document that was copied by a named individual at a certain time and date.

Additional objects and features of the invention will be more readily apparent from the following detailed description when taken in conjunction with the accompanying drawings.

DETAILED DESCRIPTION OF PREFERRED EMBODIMENTS

Information integrity has been a persistent challenge now for several decades. For example, in transmitting digital information, a checksum based on a computation of the digital information in accordance with some arbitrary algorithm could be added at the end of the transmission. The receiver of the digital data would perform the same computation and then compare its computed checksum to that included in the transmitted data. Any discrepancy indicates that the received data is not an exact replica of the transmitted data.

Any document can be digitized in any of several known ways. For instance, if the document is wholly of text, it can be converted to a stream of ASCII codes and subsequently digitized. If, instead, non-standard textual symbols are used, or non-textual, or graphical information is present in the document, the document can be digitized by known scanning processes based on black/white or dark/light transitions. That stream of digital information representing the document contents can be subjected to a checksum, hashing or similar algorithm or function whose output would then represent the actual full contents of the document. Similarly, digital information can be encoded and digitally signed. Both the digital information and the digital signature can then be encoded and printed onto a sheet of paper. The information encoded and printed onto the paper can include; for example: description of what is printed on the document (allowing verification of document content); descriptions of the physical nature of the document (allowing controlled copying and distribution of the document); or descriptions of programs that are to be loaded into and executed by the machine reading the document (whether that machine be a FAX, copier, scanner, etc.).

These efforts have been focussed on establishing the authenticity of original information or data. For example, adding a digital signature to an original document can be used to authenticate the original.

Figure 1A:
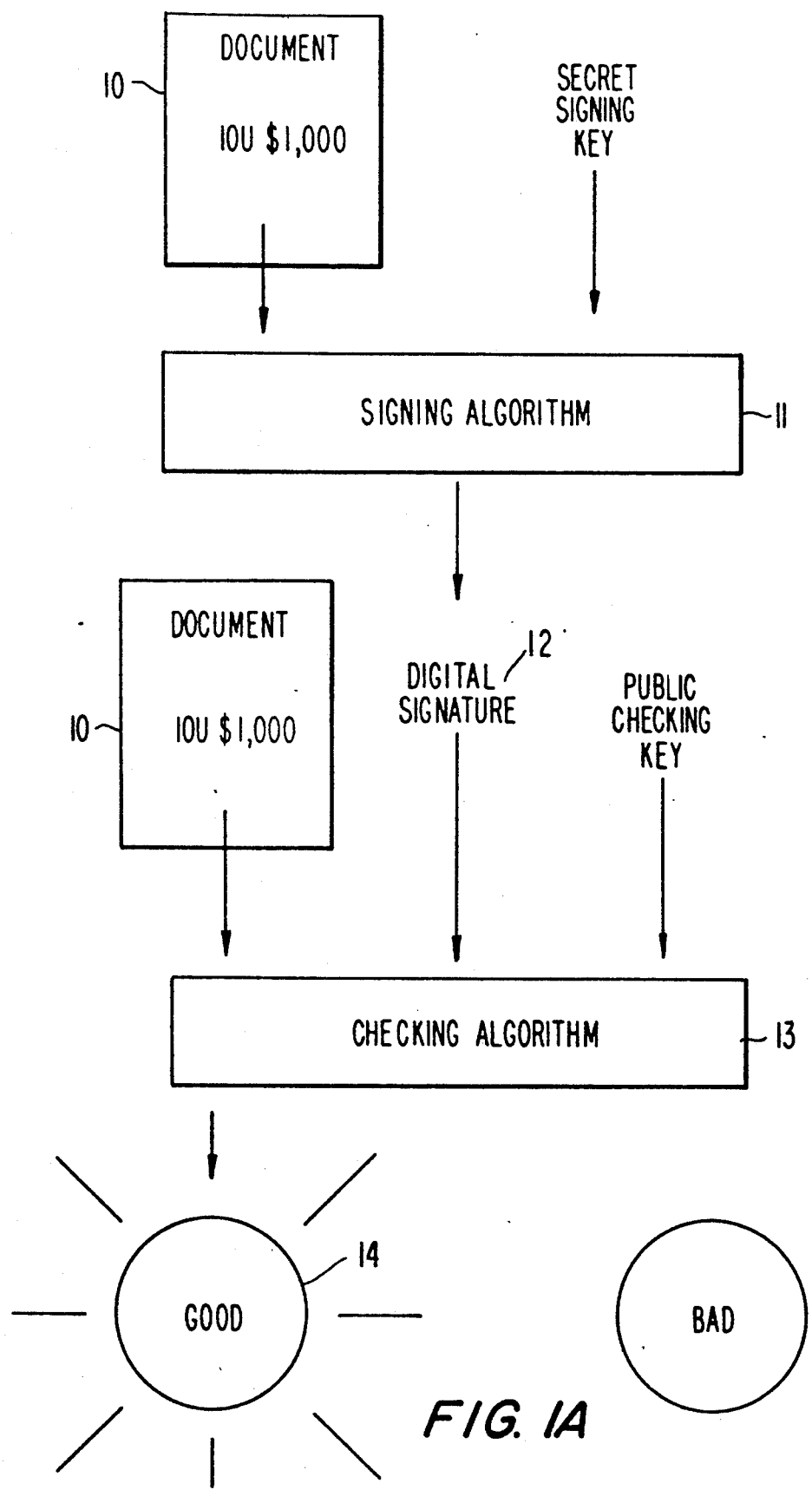
FIGS. 1A and 1B are schematic views of examples of document authentication schemes, some features of which may be used in the system of the invention.
Figure 1B:
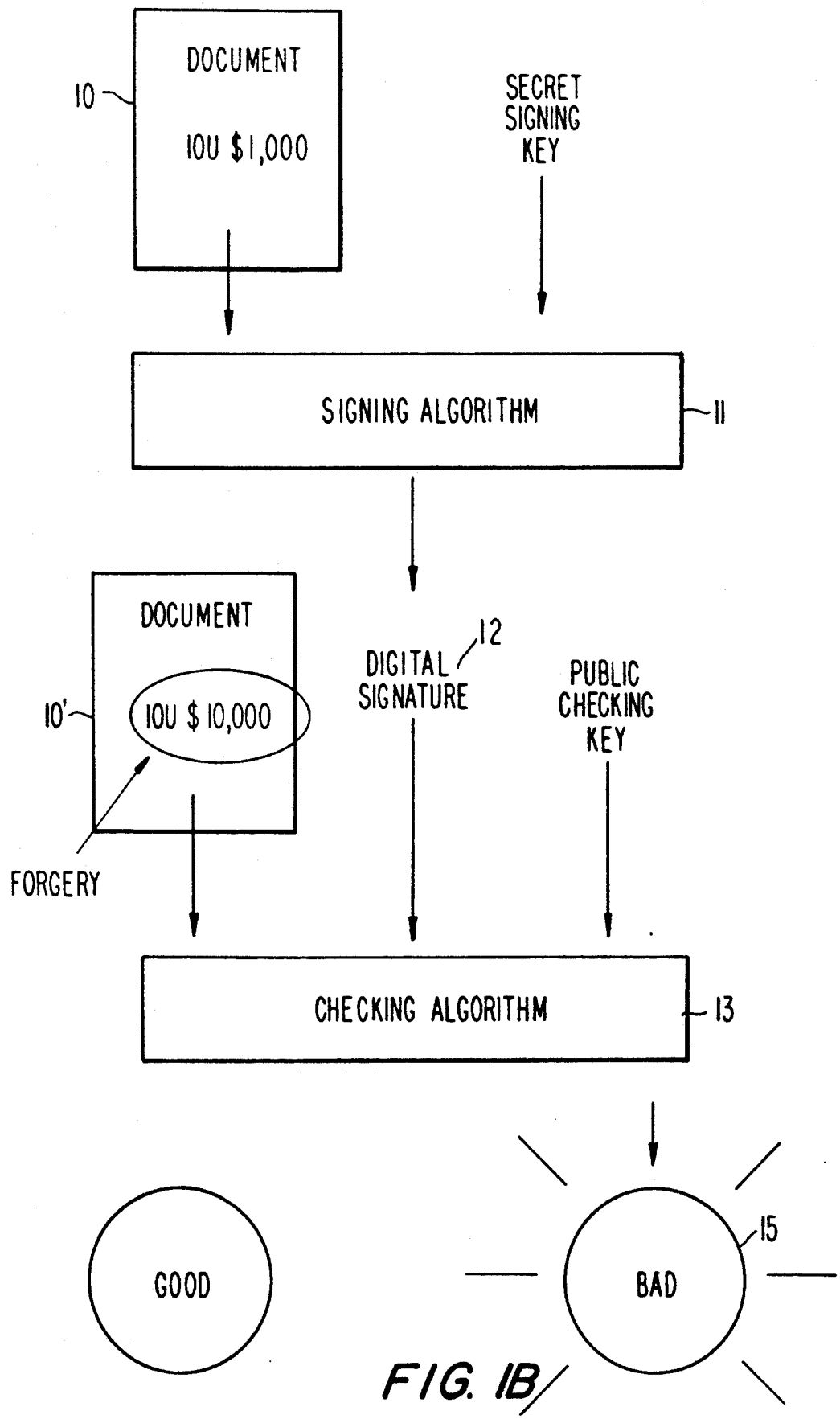

Encryption is another technique for assuring integrity of transmitted information, often used nowadays for secure electronic transmission of data or for E-mail. Many encryption schemes are known and are used today. One of the more popular schemes uses the dual public/private key system. FIGS. 1A and 1B illustrate how such a system could be employed to verify the authenticity of an original document, such as a check or IOU.

Referring now to FIGS. 1A and 1B, in the process illustrated in FIG. 1A, a document 10, which may be, for instance, an IOU for $1,000, is created as an original document. The document 10 is then scanned and digitized together with a secret signing key possessed only by the creator of the document. After being processed by one of many well known signing algorithms indicated at 11, the result is a digital signature which can be incorporated with the document or as part of the original document 10. The original document 10 with the digital signature is indicated at 12, separate from or included as part of the document 10. The latter can then be transmitted to a third party who would possess a public checking key counterpart to the secret signing key as part of this known dual key security scheme. The document would again be scanned and digitized, and the digital signature 12 together with the public checking key processed via a checking algorithm 13. This algorithm, of which again a number are known, would determine whether or not the digital signature received corresponds to that obtained directly from the original document and that the keys used by the creator and by the third party or user properly match in accordance with the checking algorithm. The output of the checking algorithm is a single bit, indicating that the signature is valid or invalid. In an actual embodiment, the output indicating an invalid signature could be a red light, or some other clearly visible indicator that the signature failed the validation check.

FIG. 1B shows a similar scheme but in this case the document 10 has been altered 10' by changing the amount of money listed on it. When processed as the original unaltered document 10, the checking algorithm would indicate a discrepancy in the document or in the document's source with an appropriate message as indicated at 15 in FIG. 1B.

To the best of our knowledge, there does not exist a way of providing to a third party a hard copy of an original document and proving that that hard copy is in fact an exact copy of an original document which exists at some other location. This is precisely where the invention of the present case comes into play.

Figure 2:
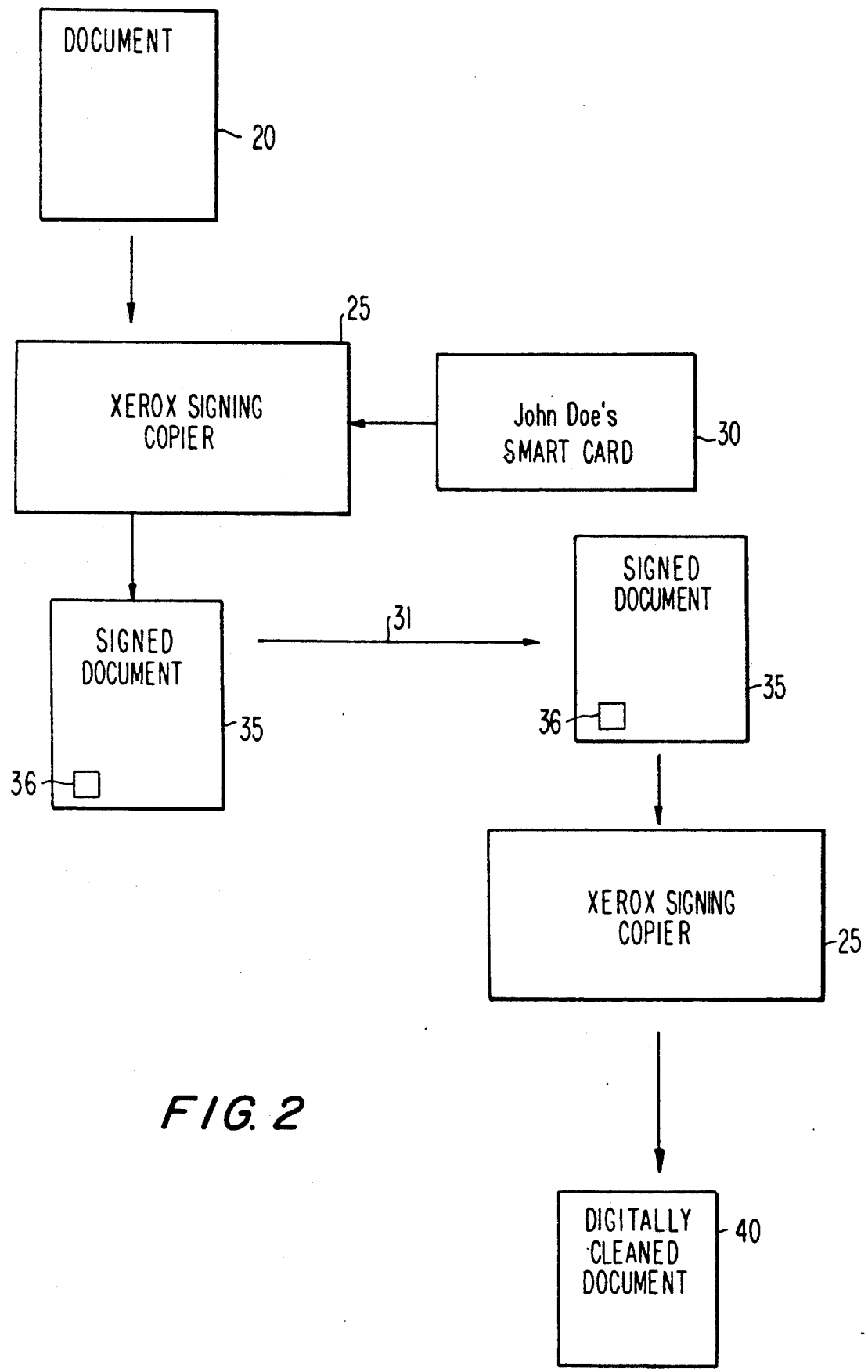
FIG. 2 is a schematic view illustrating operation of the system of the invention.

FIG. 2 illustrates schematically the operation of a preferred form of the system of the invention for authenticating hard copies of documents. In this preferred embodiment, an original document 20 is placed on a special machine 25 referred to herein as a signing copying machine or copier. While hereinafter will be disclosed an example of the system contents of a signing copier that can be used in the invention, it will be understood that the exact manner by which the signing copier makes copies of documents, or generates digital signatures of documents is not critical to the invention as any of the known copying and digitizing schemes can be used for this purpose.

In this particular case, the signing copier 25 has the ability of not only executing a normal copying function and producing or outputting a hard copy of the original document 20, but in addition it has the ability to digitize the document and generate a digital signature of that document in the manner as previously described. That digital signature of the document includes every significant piece of information on the document, as well as information that is unique to the signer, which may be a person or a group, such as a secret signing key.

In addition, the signing copier 25 can include the further feature that it has the capability of verifying the identity of the person or entity that supplies the document to the signing copier. In this particular case, we assume that the possessor of the document 20 is a person named "John Doe". John Doe has a smart card with which he can activate the signing copier 25. The smart card can be one of many different kinds of well known articles which can be inserted into a slot in the signing copier, which in turn would read certain data on the card representing the identity of that owner to be incorporated in the digital signature that is prepared from the original document 20. John Doe's secret key can be included in his smart card, as well as the signing algorithm and his public key. Alternatively, the signing algorithm can be included in the signing copier 25.

That digital signature which now includes the identification of the document supplier John Doe is now affixed 36 to the hard copy produced by the signing copier machine 25. That hard copy, designated 35, is a "signed document", meaning a document which has on it in visible or invisible form a digital signature 36 of the document contents together with an identification of the supplier or creator. Moreover, the original document 20 can be in human readable form, or encrypted for secrecy, in which case the signed document 35 would also be in human-readable or encrypted form.

The signed document 35 or hard copy can then be forwarded 31 by any known means to a third party, such as by hand delivery, or by use of one of the postal or other delivery services. That signed document 35 when received by the third party is again processed through a similar signing copier machine 25. What the signing copier machine 25 would do with the signed document 35 is essentially to digitize the contents, and check the digital signature 36.

A digital signature, by its very nature, requires the signer to have for validation a public checking key that is mathematically related to his private key. The signing copier would obtain, by any one of several means known and described in the literature, a valid copy of the signer's public checking key. As an example, but in no way the only possible method, the signer's public checking key and a "certificate" for the signer's public checking key could both be included in the original document in computer readable form. The signing copier 25 would read both the certificate and the public checking key and would validate the certificate and public checking key using a well known Public Checking Key (which can be owned by the copier manufacturer). Having validated the public checking key of the signer, the digital signature of the signer and the validity of the digital information signed by the signer could then be checked.

Alternatively, the public checking key of the particular signer could be made publicly available, as in a directory or the like, and accessed by the signing copier 25.

The output from the second signing copier used by the third party would typically be a digitally cleaned document 40, meaning a hard copy of the original document 20 free of any physical dirt or image fuzziness introduced during handling and processing of the original or signed document. This is readily accomplished because the information needed to clean the copy and restore the original was digitally encoded on the copy and thus the signing copier can readily determine what the original document actually looked like. In addition, there can be imprinted on the digitally cleaned document 40 by the signing copier a message indicating that the digitally cleaned document 40 looks like an original document that at a certain time and on a certain date was copied on a signing copier machine with the authorization of John Doe. Alternatively, the message can be omitted from the document and instead displayed on the machine. The machine could be readily programmed not to make hard copies of signed documents unless they have been properly verified in accordance with the invention. In this latter case, third parties or users would know that any copy produced by such a machine from a signed document is identical to an original signed document at some other location.

Figure 3:
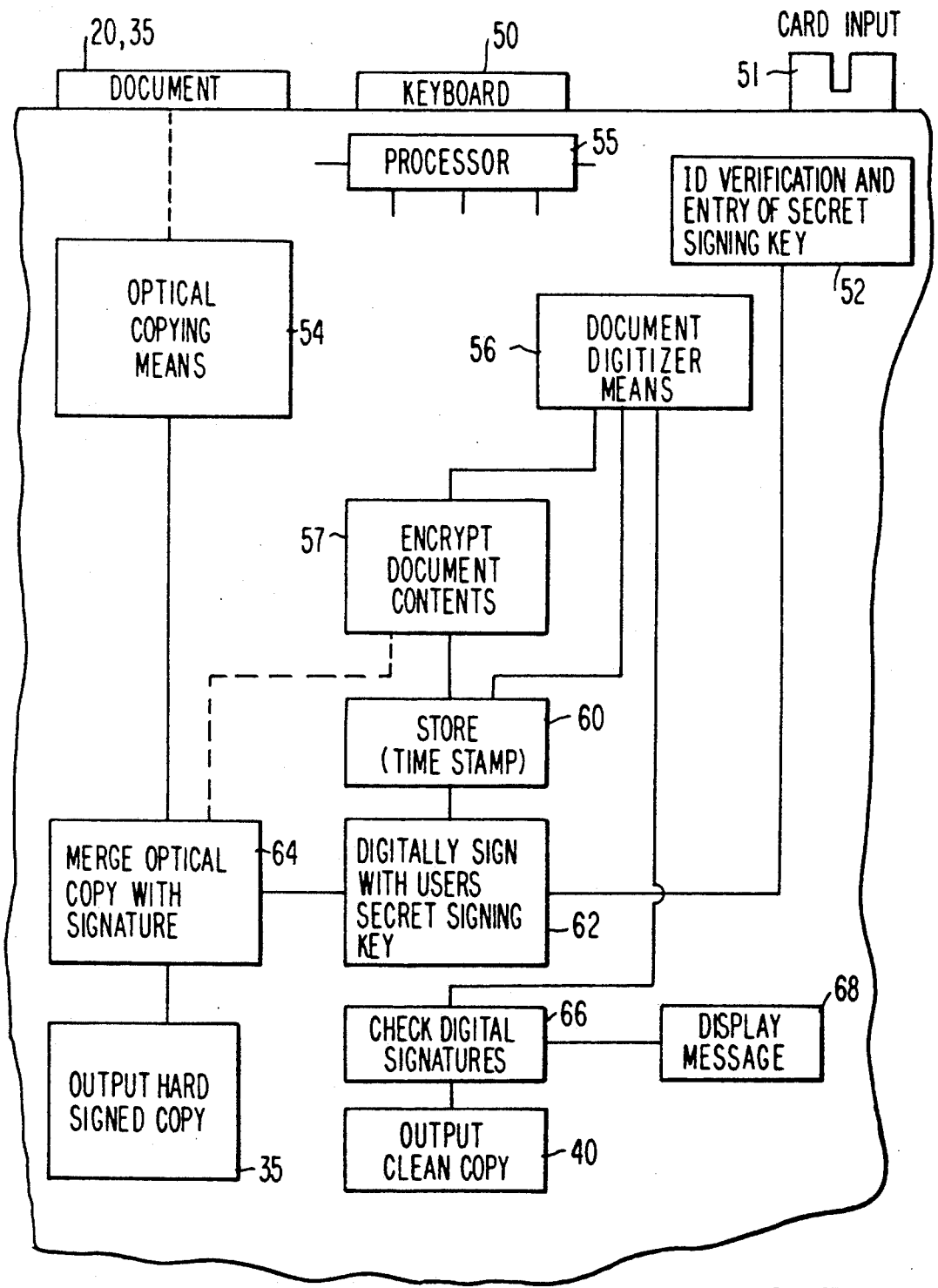
FIG. 3 is a block diagram of a copying machine usable in a system in accordance with the invention.

As mentioned previously, there are many known ways by which the various functions described above can be implemented, and the invention is not limited to the specific means by which the digitization, optical copying, comparison systems, and other verifying features are implemented. FIG. 3 shows schematically one relatively simple machine 25 which would have a space, say, on top for receiving a document which may be an original document 20 or a signed document 35, a keyboard 50 for keying in appropriate commands or instructions to the machine where necessary, and a conventional card input device 51 through which an identifier object, such as a smart card, can be passed from which information concerning the secret signing key and other information can be verified by conventional means indicated in FIG. 3 by block 52. The signing copier 25 would have the usual optical copying means 54 which would be capable of making a copy of a document. That copy could be a literal copy of the document. The exact form is not important to the invention. The processing is controlled by a conventional programmable processor 55 which, for simplicity, is not shown connected to, for example, the keyboard 50 or the card input device 51, or the ID verifier 52, or the other modules employed in the machine. The means to accomplish this would be obvious to one of average skill in the art. The signing copier would also possess a conventional scanner so that it would be capable of digitizing the information present on the document indicated at block 56. It could at the same time, optionally, encrypt at block 57 the document contents. It could also have present at 60 a device which keeps track of the current date and time of day which information can be retrieved and used whenever desired.

The signing machine 25 illustrated in FIG. 3 is capable of carrying out both sets of functions indicated in FIG. 2 in which it can produce not only the signed document 35 but also the digitally cleaned document 40 which has been authenticated. Thus some of the modules indicated in FIG. 3 would only be used at the sending end when the original document is hard copied, whereas other modules would be used at the receiving end where the digitally cleaned and authenticated hard copy of the signed document is produced. Alternatively, two different machines could be provided, one just for creating signed documents at the sending end, and the other at the receiving end for verifying the authenticity of a signed document and producing a digitally cleaned document.

Continuing with the description, at block 62 the resultant digital signature can be generated by processing with any known algorithm with the secret signing key of the user to generate a digital signature which can be affixed to the optical copy that has been made of the original document. This merger of the optical copy with the digital signature occurs at block 64. In addition, further information could be included in the digital signature, e.g., a time stamp which would indicate the date and the time when the signed document was produced.

At the receiving end, the document 35 placed on the machine would be the signed document, and in this case the function of the machine would be to make sure that the digital signature that appeared on the signed document is valid. To do this, as previously described, the copying machine must obtain a valid copy of the signer's public checking key.

After the digital signatures have been checked at block 66 will determine the next stage in the processing. There are a number of possibilities here. For example, if the digital signature is not valid, then the machine is readily programmed not to copy it, and to display on the machine a message saying that the hard copy originally presented to the machine has not been authenticated.

On the other hand, where the digital signature checks, and the original supplier was authorized, then the machine could display a message 68 indicating that a hard copy produced by the machine is identical to one that was presented to a similar machine at a certain time and date. For instance, the message could read "This document (meaning the outputted digitally cleaned copy 40) was submitted for copying by John Doe on May 9, 1991 at 1:55:35 p.m. When it was submitted, it looked like the herewith supplied copy." Alternatively, the message can be put on the document itself. As a further alternative, both forms of informing the third party user of the authenticity of the hard copy of the document can be employed.

Thus, in the system of the invention, any user document can be supplied to the machine for authentication. The signed document contents can have digital information encoded in it either in visible or invisible form. Many users of such machines would be available whose authority is readily established by being issued a card which is authenticated by the machine supplier. While a smart card is a preferred way of inputting the signer's secret signing key, in principle, the keyboard 50 can also be employed to carry out the same function by means of known password schemes. It would be possible though not essential for the signing copier machine manufacturer to issue and authenticate the smart cards of the users. At the receiving end, the signed documents would be entered for verification and the signing copier would recover the digital information encoded in the document and verify the supplier or creator.

Summarizing the preferred embodiment, a digital signature system may be thought of as two functions:

(i) signature = SIGN(document, signingKeyOfA), and (ii) valid = CHECK(document, signature, checkingKeyOfA), where:

"document" means any sequence of bits;

"signingKeyOfA" means secret information known by A which allows A (and nobody else) to generate valid signatures;

"signature" is a sequence of bits generated by the signing algorithm, with the number of bits ranging from a few hundred to a few thousand, depending on the specific system and the specific security level involved in the application, as well as various performance tradeoffs;

"checkingKeyOfA" is mathematically related to the signingKeyOfA, where user A would generate both the signing key and the checking key, and the signing key would be kept secret, while the checking key would be made public;

The "valid" flag is a simple boolean, either TRUE or FALSE. If the signature for a given document was generated by signingKeyOfA, then the CHECK function will return TRUE, indicating that everything is OK. If the signature or document has been altered in any way, then the CHECK function will return FALSE, indicating that the signature is not valid.

The following scenario is illustrative of how such applications could work and represents an algorithm describing a preferred form of the overall performance of the system:

1) The customer prepares a document, such as a signed contract, and approaches the Signing Copier.

2) The customer inserts their "signing card" into the copier, and places the original on the glass. The copier digitizes and compresses the image, signs the compressed image, and stores the signed compressed digital image in a user inconspicuous fashion on the resulting "copy" (actually a "signed original").

3) Further hard copies can now be made of the signed original, and as long as the image quality is not too degraded by repeated copying, the original digital information can be recovered from the copy and verified.

4) The special signing copier machines would recover the digital information, restore the quality of the document, and verify the authenticity of the document. Other conventional copiers could simply copy the document.

5) The "signed" nature of the document could be indicated by using special ink or special hard-to-duplicate patterns. In this fashion, the fact that the document was signed would be readily apparent on visual inspection. The physical nature of this user-obvious indicator does not affect the logical design of the system.

6) This scenario assumes that a reasonable key authentication protocol is used by the copier. In particular, it assumes that the "signing cards" issued to customers can be appropriately authenticated by a suitable entity, such as the signing copier manufacturer or supplier. The simplest method of doing this would be to issue such "signing cards" directly from the machine supplier, charging some modest price. The customer would have to present documentation adequate to persuade the supplier that they were indeed who they claimed to be, after which they would be issued a signing card. The signing cards issued by the supplier could be readily identified by any supplier's copier as authentic, but it would be impossible for any non-supplier agency (legitimate or otherwise) to issue a signing card that any supplier's copier would think was authentic.

7) The recipient of a signed copy could easily verify that it was authentic by placing it in any Signing Copier, which would verify the accuracy of the document.

8) Optionally, if desired, the signed information could describe some physical aspect of the piece of paper on which it appeared. In this way, it would be impossible to make authenticated duplicates. Known ways of doing this have been based on the pattern of fibers in the paper as a physically unique identifier for that particular piece of paper. In this scenario the agent that deals with the customer might be thought of as a "notary public" who happens to be employed by the supplier. The signing card issued to the customer can be "tamper proof," so that the customer is unable to access its contents. The signing card may have an on-board microprocessor and memory which implement the necessary algorithms. The possession by the customer of the signing card is evidence that the customer is who they claim to be. Further authentication might be required, e.g., the customer might also have to know a password, or the customer's fingerprint might be encoded in the signing card and verified by the copier. The signing copier authenticates the signing card, and might perform further authentication as needed (e.g., ask for a password or check the fingerprints). The copier would then be prepared to issued documents that had been digitally signed by the customer. From a technical point of view, changing any bit at all in either the document or the signature will invalidate the signature. If a single pixel is out of place in the image, the signature will be invalid. In practice, this means some form of error correcting code will almost certainly be required if the digital information is stored on paper. Paper can have dirt, grease, coffee, etc. spilled on it, and unless the error correcting code is quit robust, this would invalidate the signature.

For more information on digital signatures and means for implementing same, reference is made also to Matyas "Digital Signatures —An Overview", Computer Networks 3(1979) pp. 87-94, particularly Sect. 3; and Lipton et al "Making The Digital Signature Legal—And Safeguarded", Data Communications, February 1978, pp. 41-52, especially pp. 44, 47.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. A process for making an authenticatable copy of an original document supplied by an entity, comprising:
   (a) making a hard copy of the original document and incorporating on the document a digital signature representing the document contents and the identity of the said entity.
2. The process of claim 1, wherein the identity of the said entity is represented by a secret signing key of a dual key authentication system.
3. The process of claim 2, wherein the document incorporates a public key that is mathematically related to the secret signing key.
4. A process for validating the authenticity of a signed copy of an original document supplied by an entity, said signed copy having been provided with a digital signature using a secret signing key supplied by the entity comprising:
   (a) checking the digital signature of the signed copy using a public key mathematically related to the secret key,
   (b) indicating whether the signed copy is valid or invalid.
5. The process of claim 4 wherein,
   (c) if the signed copy is valid, generating a hard copy of the signed copy but without a digital signature.
6. The process of claim 5, further comprising:
   (d) including on the hard copy made in step (c) or displaying a message indicating that said hard copy of step (c) looks like the original document.
7. The process of claim 6, further comprising:
   (d)(i) including in the message an identification of the supplying entity.
8. The process of claim 6, further comprising:
   (d)(ii) including in the message the date and time when the said entity processed the original document.
9. A system for authenticating hard copies of original documents comprising:
   (a) a copying machine, said copying machine including,
      (i) means for receiving from an entity an original document,
      (ii) means for generating a digital signature from a document,
      (iii) means for receiving information uniquely identifying the entity supplying the original document,
      (iv) means for incorporating in the digital signature information representative of the entity's identification,
      (v) means for producing a signed document first copy incorporating the digital signature.
10. The system of claim 9, wherein the first copy produced by the means of (a)(v) is an encrypted copy of the original document.
11. The system of claim 9, wherein the digital signature is visible or invisible.
12. The system of claim 9, further comprising means for indicating whether the signed copy is authentic.
13. The system of claim 12, further comprising means for making a second hard copy from the first copy when the signed copy is authentic.
14. The system of claim 13, wherein the means for making the second hard copy include means for omitting the digital signature from the second copy.
15. The system of claim 14, further comprising means for displaying a message or affixing a message to the second hard copy, said message indicating the second copy looks like the original document received from the said entity on a certain date and time.
16. The system of claim 12, wherein the digital signatures incorporates information representative of a secret signing key owned by the entity.
17. The system of claim 16, wherein the indicating means use a public key mathematically related to the secret key.
18. The system of claim 17, wherein the public key or a representation thereof is incorporated in the signed copy.

* * * * *